Jan. 7, 1930. H. GORANSON ET AL 1,742,653
FRUIT PITTING MACHINE
Filed Nov. 6, 1928   2 Sheets-Sheet 1
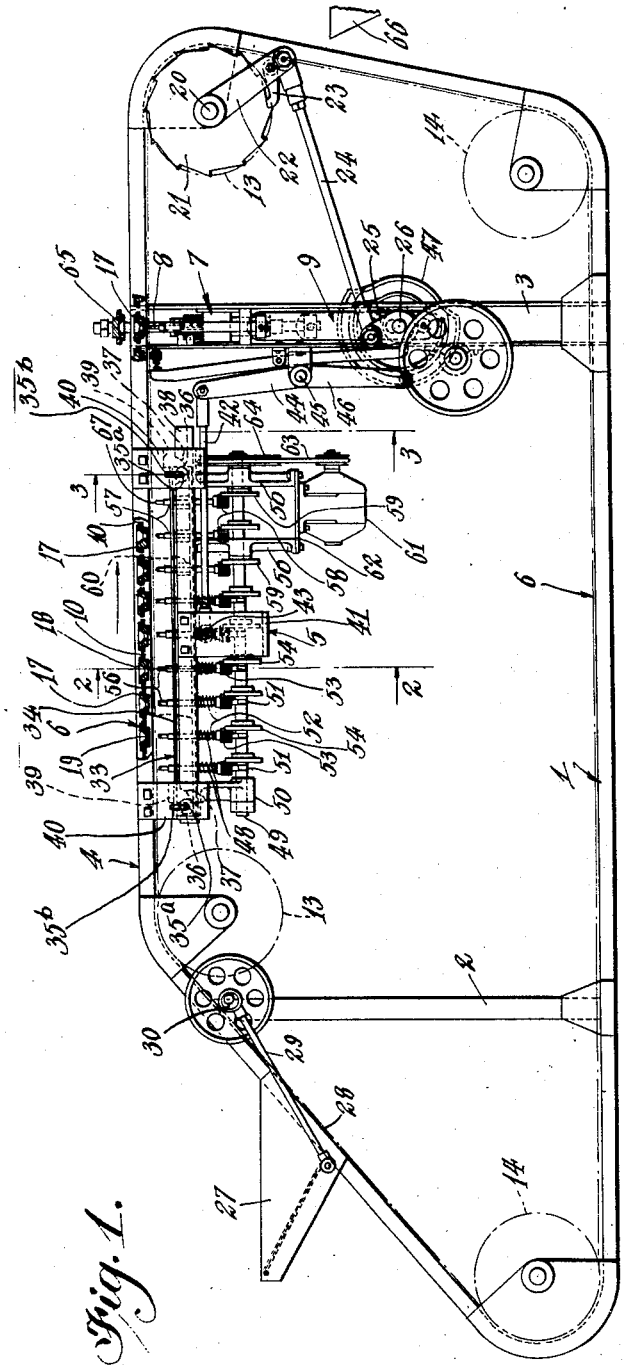
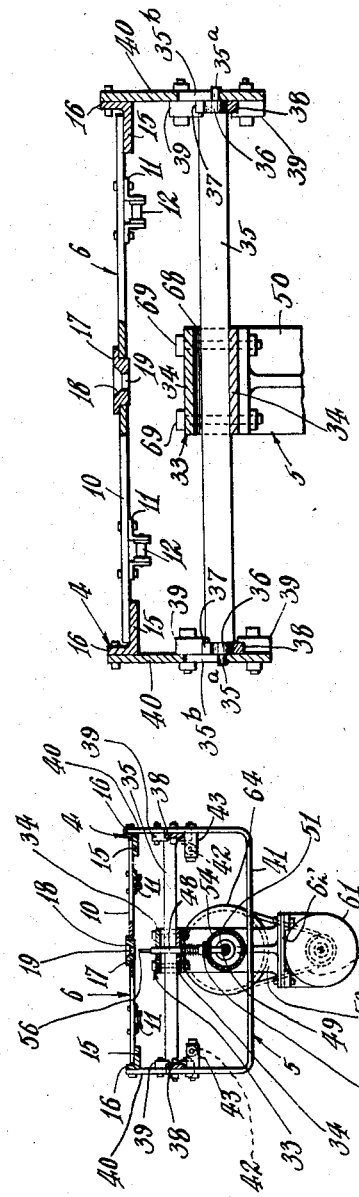
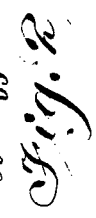
Inventors
Hjalmar Goranson
David Goranson
Burt C. Youman
By Lyon & Lyon
Attorneys Patented Jan. 7, 1930

1,742,653

UNITED STATES PATENT OFFICE

HJALMAR GORANSON AND DAVID GORANSON, OF SUNNYVALE, AND BURT C. YOUMAN, OF SAN FRANCISCO, CALIFORNIA, ASSIGNORS TO CALIFORNIA PACKING CORPORATION, OF SAN FRANCISCO, CALIFORNIA, A CORPORATION OF NEW YORK

FRUIT-PITTING MACHINE

Application filed November 6, 1928. Serial No. 317,518.

This invention relates to fruit pitting machinery. While features of the invention may be applied to fruit pitters of various types, in the present specification the invention is described as applied to a type of fruit pitter in which the fruit is placed in a holder having an opening in its under side through which the pitting knife passes upwardly to engage the pit and remove it by pulling it down through the opening. With a machine of this type which operates upon cherries it is desirable to have the stem side of the fruit, that is to say, the side of the fruit carrying the depression or dimple of the fruit where the stem attaches, rather accurately centered in the opening of the holder before the pitting knife operates to remove the pit. By having the fruit nicely centered in this way, the pit can be more readily removed, and the body of the fruit that remains after removal of the pit is more presentable in appearance. The general object of this invention is to provide simple means for meeting these requirements and to provide a machine which will operate in such a way that when the holders present the fruit to the pitting knife, the fruit will be properly centered in the holder.

A further object of the invention is to construct a machine having these novel features and which will have a relatively great capacity, that is to say, which will be capable of pitting fruit in relatively large quantities.

In the preferred embodiment of the invention we employ a movable guide frame carrying means for engaging the fruit in the holders to turn the same into the desired position for the fruit, and one of the objects of the invention is to provide simple means for guiding and mounting this frame so as to enable a gang of the holders carrying the fruit to be operated upon simultaneously, in other words, to provide a construction which will subject the fruit in the holders to repeated operations which effect the centering of the fruit in the holder preparatory to the operation of the pitting knives.

Further objects of the invention will appear hereinafter.

The invention consists in the novel parts and combination of parts to be described hereinafter, all of which contribute to produce an efficient fruit pitting machine.

A preferred embodiment of the invention is described in the following specification, while the broad scope of the invention is pointed out in the appended claims.

Figure 1 is a side elevation upon a reduced scale illustrating a machine embodying our invention, certain parts being broken away and shown in section.

Figure 2 is a cross-section through the machine taken about on the line 2—2 of Figure 1.

Figure 3 is a section through the machine upon an enlarged scale taken about on the line 3—3 of Figure 1.

Figures 4, 5:
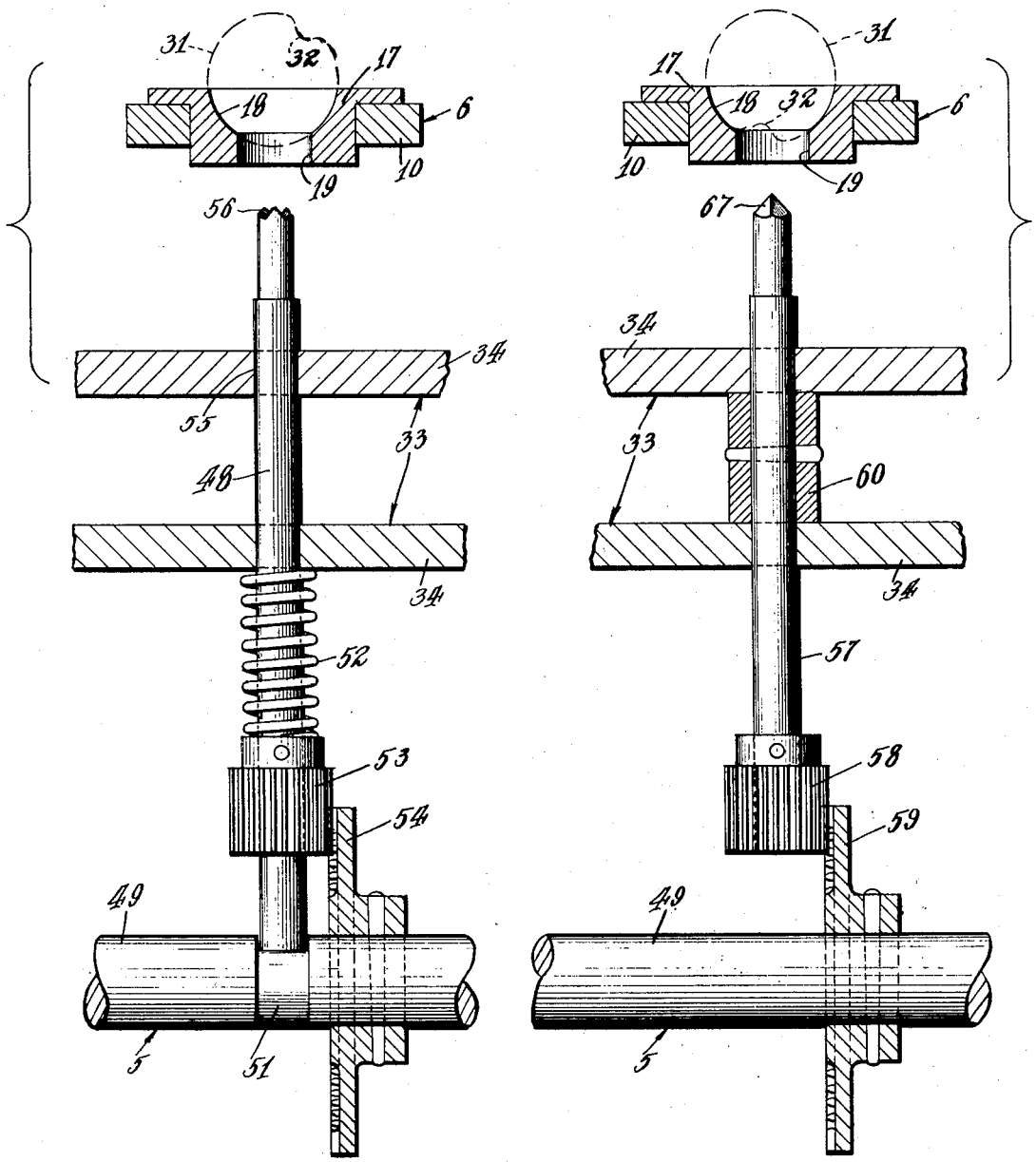
Figure 4 is a vertical section upon an enlarged scale through the machine, and further illustrating details of the construction and mode of operation of the machine. This view indicates the first stage of operation of the machine in effecting the turning and centering of the fruit in the holder.
Figure 5 is a view similar to Figure 4, but showing another stage or phase in the operation of the machine.

Before proceeding to a detailed description of this embodiment of our invention, it should be stated that a mechanism has been devised for pitting fruit, for example, cherries, in which the fruit is held in a holder having an opening in its under side. While the fruit is held in the holder, a pitting tool passes into the opening, engages the pit and removes it. It is desirable that the fruit should be held in a certain definite position, that is to say, in a properly centered position, when the pitting tool operates upon it. The preferred position for the fruit is with the stem side, or dimple of the fruit, disposed centrally in the opening through which the pitting tool passes into the fruit. By centering the fruit accurately, the pitted fruit will have lost a minimum amount of its "flesh" or body, and the fruit presents a more attractive and salable appearance.

According to our invention, we provide improved means for effecting this centering of the fruit. In the operation of this means for centering the fruit, it is found in practice that it is most effective if a succession of centering operations are applied to the fruit so that the fruit is progressively turned into the desired position, with the dimple opposite the pitter opening of the holder.

While it is obvious that mechanism embodying this invention may assume various types or forms, we shall now describe the invention as applied to a continuously operating pitting machine of the belt conveyor type, in which the fruit is fed onto holders carried on the belt, in any position, after which devices operate upon the fruit in the holders to turn the fruit into the desired position.

Referring more particularly to the parts, 1 represents a frame including uprights or standards 2 and 3 which support the "table" 4 which constitutes the upper portion of the frame and at which the centering operations take place. The centering mechanism, 5, is located below the table 4. The conveyor 6, carrying the fruit, moves in the direction of the arrow, and after passing the centering mechanism 5, it passes into position in line with pitting mechanism 7, where the pit is removed. This pitting mechanism 7 forms no part of this invention, but at this point it may be stated that it involves the use of a pitting tool 8 which is actuated by mechanism at 9 to pass upwardly into the holder and remove the pit of the fruit. However, this pitting mechanism may be of any desired construction.

The conveyor 6 is of the belt type called a draper, and involves the use of a plurality of cross-slats 10 attached by brackets 11 (see Figure 3) to the links 12 of two endless chains. These chains are guided around upper sprocket wheels 13 at about the level of the table 4 and pass down around two lower sprocket wheels 14 near the base of the frame.

The table 4 comprises two ledges 15 which are horizontal flanges on angle-irons 16 which extend longitudinally of the frame and form the upper portion of the frame of the machine.

Each slat 10 carries a fruit holder 17 (see Figure 3) which is preferably in the form of a cup with a spherical recess 18 in its upper side and an opening 19 in its under side. In the operation of the machine, the conveyor 6 is advanced with a step by step movement so as to carry the fruit past the centering mechanism and then past the pitter mechanism 7. For this purpose the shaft 20 of the sprocket wheels 13 is provided with a ratchet 21 co-operating with a pawl arm 22 and pawl 23 which is actuated by a connecting rod 24 attached to a crank 25 on a shaft 26 mounted in the frame and forming a part of the actuating mechanism for the machine. This shaft 26 constitutes a driving shaft for the machine and may be driven in any suitable manner. It also carries cams for actuating some of the moving parts of the machine.

The fruit, such as cherries, is placed in a feed hopper 27 (see Figure 1) past which the conveyor 6 moves in an upwardly inclined direction as it passes toward the table 4. The hopper 27 has its bottom side 28 disposed against the conveyor so that as the holders 17 pass the hopper, cherries will become lodged in the cups or recesses 18. In order to facilitate this mode of operation, the hopper 27 is continuously jostled or vibrated by means of an eccentric rod 29 actuated by an eccentric 30 on a cross-shaft which may be driven in any suitable manner, not illustrated.

The cherries placed in the cups 17 are placed indiscriminately, for example, see Figure 4, where the cherry 31 is indicated in dotted lines. The stem side or dimple 32 of this cherry may be in any position, for example, such as that illustrated in Figure 4. We provide means for operating upon the cherry to turn it over and center the dimple 32 substantially on the axis of the opening 19 of the holder 17. In accomplishing this it should be understood that it is necessary that the d mple should be rather accurately centered on the axis of the opening 19 before the pitter tool 8 passes up through the opening. In order to accomplish this most effectively, we provide means for subjecting the fruit to vibrations and a turning movement, the effect of which is to turn the fruit over and bring the dimple 32 downward, after which means operates upon the fruit to center the dimple quite accurately in the opening 19. However, it should be understood that, where it is not necessary to have the dimple very accurately aligned, the accurate centering means may be dispensed with. To this end, we provide means passing up through the opening 19 to engage the under side of the fruit, and this means is vibrated and rotated so as to turn the fruit over and bring its dimple 32 into a position adjacent the opening 19. This mechanism is preferably mounted in a unitary construction and includes a guide frame 33, said frame including two longitudinally disposed flat bars 34 connected at their ends by cross-bars or cross-heads 35. These cross-heads are provided in order to facilitate the raising and lowering of this guide frame in timed relation to the periodic advance and step by step movement of the holders 17 on the conveyor 6. The cross-heads 35 have pins 35$^a$ on their ends guided in guide slots 35$^b$ in frame plates 40.

For this purpose the ends of each cross-head 35 are provided with rollers 36, respectively, and these rollers are engaged by cams 37 formed on the ends of longitudinally movable cam bars 38 guided between suitable guide blocks 39 attached to the inner faces of frame plates 40 that extend down from the angle irons 16. The cam bars 38 are connected to move in unison by means of a U-shaped yoke 41. The cam bars 38 are shifted longitudinally toward the left, as viewed in Figure 1, at the proper times to raise the guide frame 33. For this purpose we provide two eccentric rods 42 that are pivotally attached at 43 to the yoke 41, the other ends of the eccentric rods being attached to actuating levers 44, respectively, which are mounted on a rock-shaft 45 actuated by a cam arm 46 engaging a cam 47 carried on the shaft 26.

The guide frame 33 carries vertical guide stems of two types. As illustrated in Figure 1, there are six stems 48 of the type illustrated in Figure 4. These stems are vibrators and operate to engage the under side of the fruit 31 while vibrating it up and down and at the same time they are rotated. In order to attain this mode of operation, we prefer to provide a continuously driven cam shaft 49 mounted on brackets 50 forming part of the guide frame 33. This cam shaft is provided with an eccentric or cam neck 51 which engages the butt end of each stem 48. The stems are held by coil springs 52 against their cams and each stem is provided with a pinion 53 for rotating it, said pinion being a straight elongated pinion meshing with a gear wheel 54 which is rigidly attached to the shaft 49. This arrangement permits the pinion 53 to move up and down with the stem 48 to which it is rigidly attached and at the same time maintain driving connection with the gear wheel 54 so that it is continuously rotated.

It should be understood, of course, that the stems 48 are guided to slide freely up and down in openings 55 formed in the plates 34 that form the guide frame 33. The upper end of each stem 48 is formed into a multiple pronged head 56 having circumferentially disposed points for engaging the under side of the fruit 31. While these points are in engagement with the fruit, the stem rotates on its axis and is vibrated up and down. In the operation of the machine, each cup 17 carrying a cherry moves into alignment in succession with the different stems 48.

In the present instance, there is a gang of six of these stems, but in practice, a greater or less number of them may be employed if desired.

The operation of the stems 48 will result generally in turning the fruit into a position such as that shown in Figure 5, with the dimple 32 of the fruit disposed downwardly in the cup 17 but not in accurate alignment with the axis of the opening. In order to effect an accurate alignment, we provide a second gang of stems 57, which are mounted in the frame 33 so as to rise and fall with the frame, but these stems, unlike the stems 48, need not have any longitudinal movement such as the vibrating movement which is imparted to the stems 48. However, they are continuously rotated by means of the pinion 58 at the lower end of each stem similar to the pinion 53 and rotated continuously by a gear wheel 59 on the shaft 49 and similar to the gear wheel 54. In order to enable the frame 33 to carry the stems 57 up and down with it, and also to prevent vibration, each stem 57 is provided with a collar 60 which operates as a distance sleeve between the plates 34. Each sleeve 60 is pinned to its corresponding stem 57.

Any suitable means may be employed for driving the shaft 49 continuously. In the present instance we accomplish this by means of a small electric motor 61 (see Figure 1) which is attached to a base plate 62 straddling two of the brackets 50 which have a special construction for this purpose. This motor 61 drives a belt 63 that drives a belt pulley 64 on the shaft 49.

The pitting mechanism at 7 may include a cap 65 which fits down over each holder 17 when the same comes into alignment with the cap. This cap holds the fruit in the holder while the pitting tool 8 is moving up through the opening 19 to remove the pit. After removal of the pit, the pitted fruit passes on to the right hand of the machine, where it falls into a hopper 66 (see Figure 1).

The upper end of each stem 57 is formed with a tapered nose or point 67. When the frame 33 rises, this tapered or conical point 67 engages the under side of the fruit 31 and slightly unseats the fruit in the cup 17. By reason of the rotation and the proximity of the dimple 32, the point 67 will engage the dimple and leave the fruit with the dimple 32 disposed substantially on the axis of the stem 57, when the stem descends.

In order to provide for vertical adjustment of the stems 48 and 57 to regulate the position of their upper ends with respect to the holders 17, any suitable means may be provided. As illustrated in Figure 3, we may provide liner plates or shims 68 which may be disposed above and below the cross-heads 35 and between them and the bars 34 of the frame 33. In other words, these shims are fastened between one or both sides of the cross-heads 35 which are secured to the bars 34 by bolts 69.

We will now describe the general mode of operation of the machine.

The driven shaft 26 operating through the eccentric rod 24 operates the ratchet wheel 20 so as to give the conveyor 6 a step by step advancing movement in the direction of the arrow indicated in Figure 1. As the conveyor carrying the cups 17 or holders passes the hopper 27, the fruit is deposited in any position in the holders, for example, the dimple 32 of the fruit may be disposed upwardly (see Figure 4). As the movement of the conveyor continues, the holders stop momentarily in succession over the gang of stems 48. As they do so, the guide frame 33 rises so as to bring the upper end of each stem 48 in contact with the under side of the fruit at the opening 19. As the same time, the cams 51 vibrate the stems 48 and the gear wheels 54 rotate the stems through the pinions 53. This turns the fruit into a position such as that shown in Figure 5, in which the dimple 32 is located adjacent the opening 19, but not accurately centered in the opening.

The stems 57 rise with the guide frame 33 and gently engage the under side of the fruit at or in the vicinity of the dimple 32, and as they rotate they eventually center the dimple on the point 67. In doing this, they slightly raise or unseat the fruit in the holder. They then descend with the guide frame 33, leaving the fruit with the dimple 32 in substantial alignment with the central axis of the opening 19, which is the desired position for the fruit when it is operated upon by the pitter tool 8.

While we have illustrated only one line of cups or holders 17 for the fruit, on the conveyor 6, it is obvious that, if desired, the width of the conveyor 6 can be increased so as to enable a number of units of centering and pitting tools to be employed, thereby increasing the capacity of the machine.

It is understood that the embodiment of the invention described herein is only one of the many embodiments this invention may take, and we do not wish to be limited in the practice of the invention, nor in the claims, to the particular embodiment set forth.

What we claim is:

1. In a fruit pitting machine, the combination of a holder for the fruit having an opening in its side, means for placing the fruit in the holder in any position, means for vibrating the fruit to rotate the same into a position with the dimple of the fruit adjacent to the opening, and means operating through the opening thereafter to remove the pit.

2. In a fruit pitting machine, the combination of a holder for the fruit having an opening in its under side, means for placing the fruit in the holder in any position, means for vibrating the fruit to rotate the same into a position with the dimple of the fruit downward and adjacent the opening, means operating thereafter to center the dimple of the fruit in the opening, and means operating through the opening thereafter to remove the pit.

3. In a fruit pitting machine, the combination of a holder for the fruit having an opening in its under side, means for placing the fruit in the holder in any position, means for engaging the under side of the fruit through the opening and for vibrating the fruit to rotate the same into a position with the dimple of the fruit downward and adjacent to the opening, and means operating through the opening thereafter to remove the pit.

4. In a fruit pitting machine, the combination of a holder for the fruit having an opening in its under side, means for placing the fruit in the holder in any position, means guided to move up through the opening to engage the under side of the fruit, means for vibrating and rotating the stem to rotate the fruit into a position with the dimple of the fruit downward, and means operating through the opening thereafter to remove the pit.

5. In a fruit pitting machine, the combination of a holder for the fruit having an opening in its under side, means for placing the fruit in the holder in any position, a stem, means for moving the stem upward into the opening to engage the under side of the fruit, means for vibrating and rotating the stem to turn the fruit into a position with the dimple of the fruit downward, and means operating through said opening thereafter to remove the pit.

6. In a fruit pitting machine, the combination of a holder for the fruit having an opening in its under side, means for placing the fruit in the holder in any position, and means for engaging the fruit and vibrating the same to turn the fruit into a position with the dimple downward.

7. In a fruit pitting machine, the combination of a holder for the fruit having an opening in its under side, means for placing the fruit in the holder in any position, a stem, means for guiding the stem to move up into the opening and engage the under side of the fruit, and means for vibrating the stem longitudinally and for rotating the same to turn the fruit so as to bring the dimple of the fruit downward and adjacent to the opening.

8. In a fruit pitting machine, the combination of a holder for the fruit having an opening in its under side, means for placing the fruit in the holder in any position, a stem, means for guiding the stem to move up into the opening and engage the under side of the fruit, means for vibrating the stem longitudinally and for rotating the same to turn the fruit so as to bring the dimple of the fruit downward and adjacent to the opening, and centering means operating to move into the opening to engage the fruit and center the dimple in the opening.

9. In a fruit pitting machine, the combination of a holder for the fruit having an opening in its under side, means for placing the fruit in the holder in any position, a stem, means for guiding the stem to move up into the opening and engage the under side of the fruit, means for vibrating the stem longitudinally and for rotating the same to turn the fruit so as to bring the dimples of the fruit downward and adjacent to the opening, centering means operating to move into the opening to engage the fruit and center the dimple in the opening, and means operating through the said opening to remove the pit.

10. In a fruit pitting machine, the combination of a holder for the fruit having an opening in its under side, means for placing the fruit in the holder in any position, a stem, means for moving the stem longitudinally into said opening to engage the fruit, means for engaging the said stem to vibrate the same longitudinally, and means for rotating the stem to turn the fruit in the holder and bring the dimple of the fruit into position adjacent said opening.

11. In a fruit pitting machine, the combination of a holder for the fruit having an opening in its under side, means for placing the fruit in the holder in any position, a stem, means for moving the stem longitudinally into said opening to engage the fruit, means for engaging the said stem to vibrate the same longitudinally, means for rotating the stem to turn the fruit in the holder and bring the dimple of the fruit into position adjacent said opening, and a centering stem to pass up into the opening thereafter and engage the fruit to center the dimple in the opening.

12. In a fruit pitting machine, the combination of a holder for the fruit having an opening in its under side, means for placing the fruit in the holder in any position, a stem, means for moving the stem longitudinally into said opening to engage the fruit, means for engaging the said stem to vibrate the same longitudinally, means for rotating the stem to turn the fruit in the holder and bring the dimple of the fruit into position adjacent said opening, a centering stem to pass up into the opening thereafter and engage the fruit to center the dimple in the opening, and means for removing the pit thereafter.

13. In a fruit pitting machine, the combination of a holder for the fruit having an opening in its under side, means for placing the fruit in the holder in any position, a guide frame below the holder, a stem guided in said frame to pass up into the opening to engage the under side of the fruit, a continuously driven cam for engaging the stem to vibrate the same longitudinally, a spring associated with the stem, and means for rotating the stem to turn the fruit to bring the dimple of the fruit into position adjacent the opening.

14. In a fruit pitting machine, the combination of a holder for the fruit having an opening in its under side, means for placing the fruit in the holder in any position, a guide frame below the holder, a stem guided in said frame to pass up into the opening to engage the under side of the fruit, a continuously driven cam for engaging the stem to vibrate the same longitudinally, a spring associated with the stem, means for rotating the stem to turn the fruit to bring the dimple of the fruit into position adjacent the opening, a centering stem carried by said guide frame to pass up into said opening and engage the fruit, with means for rotating the same to center the dimple of the fruit in the said opening.

15. In a fruit pitting machine, the combination of a holder for the fruit having an opening in its under side, means for placing the fruit in the holder in any position, a guide frame mounted to move up and down below the said holder, a vibrator stem carried in the frame operating to move up into the said opening and engage the fruit, means for vibrating the stem and rotating the same to turn the fruit and bring the dimple of the fruit into position adjacent the opening, means for advancing the holder to carry the fruit into a second position, a centering stem carried by the frame in alignment with the said opening when the holder is in said second position and operating when the frame rises, to engage the fruit, and means for rotating the centering stem to center the dimple of the fruit in the said opening.

16. In a fruit pitting machine, the combination of a conveyor, a plurality of fruit holders on the conveyor, each holder having an opening in its under side, a guide frame below the said conveyor, and a plurality of vibrators carried by the guide frame for engaging the under side of the fruit through the said openings and operating to turn the fruit to bring the dimple of the fruit adjacent to the said opening.

17. In a fruit pitting machine, the combination of a conveyor, a plurality of fruit holders on the conveyor, each holder having an opening in its under side, a guide frame below the said conveyor, a plurality of vibrators carried by the guide frame for engaging the under side of the fruit through the said openings and operating to turn the fruit to bring the dimple of the fruit adjacent to the said opening, means for advancing the conveyor to bring the holders in succession into another position, and means located at said other position for removing the pit of the fruit.

18. In a fruit pitting machine, the combination of a belt conveyor, a plurality of holders for the fruit mounted on the conveyor, each holder having an opening in its under side, means for placing the fruit in the holders in any position, means operating upon the fruit in the holders to turn the same to bring the fruit into position with its dimple adjacent the opening of the holder, and means operating through the openings thereafter to remove the pit of the fruit.

19. In a fruit pitting machine, the combination of a frame, a conveyor guided along said frame, a plurality of fruit holders mounted on the conveyor, each holder having an opening in its under side, a guide frame mounted on said frame below the conveyor, means for raising or lowering the said guide frame, means carried by the guide frame for engaging the fruit through the openings in the holders to turn the fruit to bring the dimple of the fruit into position adjacent the opening of the holder, and means operating thereafter through the said openings to remove the pits.

20. In a fruit pitting machine, the combination of a frame, a conveyor guided to move along said frame, a plurality of fruit holders mounted on the conveyor, each holder having an opening in its under side, a guide frame supported on the first named frame, a plurality of stems mounted on the guide frame for engaging the fruit in the holders through the said openings, a motor carried on the said guide frame for actuating the said stems, means for raising or lowering the said guide frame to bring the stems into engagement with the fruit to turn the same and bring the dimple of the fruit into position adjacent the opening in each holder, and means operating thereafter to remove the pits from the fruit.

Signed at San Francisco, Calif., this 27th day of October, 1928.

HJALMAR GORANSON.
DAVID GORANSON.
BURT C. YOUMAN.